United States Patent
Blumenschein et al.

(10) Patent No.: US 7,790,797 B2
(45) Date of Patent: Sep. 7, 2010

(54) MATT POLYMERIZATION GLUE

(75) Inventors: Michael Blumenschein, Bensheim (DE); Carlo Schuetz, Messel (DE); Xenia Dann, Gernsheim (DE); Roland Saettler, Ober-Ramstadt (DE)

(73) Assignee: Evonik Rohm GmbH, Darmstadt (DE)

( * ) Notice: Subject to any disclaimer, the term of this patent is extended or adjusted under 35 U.S.C. 154(b) by 378 days.

(21) Appl. No.: 10/503,941

(22) PCT Filed: Nov. 21, 2003

(86) PCT No.: PCT/EP03/13058

§ 371 (c)(1), (2), (4) Date: Jan. 26, 2005

(87) PCT Pub. No.: WO2004/065519

PCT Pub. Date: Aug. 5, 2004

(65) Prior Publication Data

US 2005/0124731 A1    Jun. 9, 2005

(30) Foreign Application Priority Data

Jan. 21, 2003    (DE)    ................. 103 02 416

(51) Int. Cl.
B60C 1/00    (2006.01)
C08K 7/00    (2006.01)

(52) U.S. Cl. ...................... 524/492; 523/220

(58) Field of Classification Search ............... 524/492; 523/220

See application file for complete search history.

(56) References Cited

U.S. PATENT DOCUMENTS

| | | | | |
|---|---|---|---|---|
| 3,389,013 A | * | 6/1968 | Armitage et al. | 428/204 |
| 3,420,729 A | * | 1/1969 | Roberts | 428/35.7 |
| 4,180,913 A | * | 1/1980 | Takeuchi et al. | 433/228.1 |
| 5,316,867 A | * | 5/1994 | Chao et al. | 428/626 |
| 6,358,043 B1 | * | 3/2002 | Mottate et al. | 433/8 |
| 2003/0181611 A1 | * | 9/2003 | Sonnenschein et al. | 526/217 |
| 2003/0191230 A1 | * | 10/2003 | Ladatto | 524/500 |

FOREIGN PATENT DOCUMENTS

| | | |
|---|---|---|
| JP | 04-300980 | 10/1992 |
| JP | 6-025512 | 2/1994 |
| JP | 2000-299326 | 10/2000 |
| JP | 2000-299326 A | 10/2000 |
| JP | 02000299326 A * | 10/2000 |
| JP | 2001-177236 | 6/2001 |
| JP | 2001-177236 A | 6/2001 |
| JP | 02001177236 A * | 6/2001 |

OTHER PUBLICATIONS

Huber Defoamers product literature (http://www.hubermaterials.com/591.htm) © 2007 J.M. Huber Corporation.*

* cited by examiner

*Primary Examiner*—William K Cheung
(74) *Attorney, Agent, or Firm*—Oblon, Spivak, McClelland, Maier & Neustadt, L.L.P.

(57) ABSTRACT

The adhesive bonding of matted PMMA with customary polymerization adhesives leads to very shiny bond seams, since the cured polymerization adhesives have a shiny surface. This emphasizes the very joining zones which it is intended that the viewer of bonded products should not perceive. The adhesive should therefore be matted after curing. The adhesive has for its basis a polymerization adhesive, preferably a (meth)acrylate-based adhesive. Two different kinds of silica are added as disperse powder to the polymerization adhesive, namely a silica powder having an average particle size of from 1 µm to 10 µm (matting agent) and a silica powder having an average particle size of more than 10 µm up to 200 µm (texturing agent).

17 Claims, No Drawings

MATT POLYMERIZATION GLUE

FIELD OF THE INVENTION

For reasons of esthetics, design and/or lighting, sheets of clear glass are often not used for furniture or buildings; areas of matted glass are used instead. Matted (frosted) glass is produced by sandblasting, etching or adhesive application of a matted film.

Transparent plastics can also be matted in suitable fashion. One example thereof is matted PMMA (polymethyl methacrylate). Like glass, PMMA can be matted by mechanical or chemical processing. Another method is the polymerization of methyl methacrylate (MMA) between matted glass sheets. In the extrusion of PMMA molding compounds an optically matt impression can likewise be produced by adding light scattering beads. In association with the cooling of the melt and the associated surface contraction, the light scattering beads, which are thermally more stable, produce a matt-textured surface.

The adhesive bonding of matted products, particularly PMMA products, has to date been possible only using polymerization adhesives.

Polymerization adhesives based on polymethyl methacrylate are known and commercially customary (see, for example, EP 548 740 or EP 675 184). They comprise, for example, solutions of polymethyl methacrylate in methyl methacrylate, referred to as a syrup, which is polymerized by means of a polymerization initiator. The polymerization initiator comprises a free-radical initiator, e.g., a UV initiator, a redox initiator or a thermo- or photo-activable free-radical initiator. The adhesive can be introduced, for example, into a V-shaped groove between the parts to be bonded, where it polymerizes and leads to a particularly firm bond.

Commercially customary and hence analyzable are multicomponent adhesive systems (e.g., ACRIFIX® 190, Röhm GmbH & Co KG, D-64293 Darmstadt), in which the polymethyl methacrylate/methyl methacrylate syrup is separate from the polymerization initiator, e.g., an aromatic amine and a benzoyl peroxide. For processing, the two components are mixed, preferably degassed, in order to prevent formation of bubbles, and then placed between the parts to be bonded, where the reactive mixture cures to a firm adhesive bond. The multicomponent adhesive systems may further comprise catalyzing compounds such as metal oxides and/or reaction-retarding compounds, such as lactic acid derivatives, for example, which in combination with the polymerization initiator that is used influence the polymerization time and quality of the adhesive bond.

Polymerization adhesives of this kind are suitable for bonding parts which may consist, for example, of acrylonitrile-butadiene-styrene (ABS), cellulose acetate-butyrate (CAB), polystyrene (PS), polycarbonate (PC), polyvinyl chloride (PVC), styrene/α-styrene copolymer (S/MS), unsaturated polyester (UP) or wood, but especially for parts made of PMMA.

The adhesive bonding of matted PMMA with customary polymerization adhesives leads to highly shiny bond seams, since the cured polymerization adhesives have a shiny surface. This emphasizes the very joining zones which it is intended that the viewer of bonded products should not perceive.

Attempts to improve the visual impression are described in JP 4,300,980. Therein silica particles with a diameter of less than 100 nm are added to the adhesive in order to give the cured adhesive an impression of mattness.

It is an object of the invention to specify an unobtrusive adhesive for the bonding of matted products which is adapted to the substrate.

This object is achieved by means of the inventions with the features of the independent claims. Advantageous developments of the inventions are characterized in the dependent claims.

In accordance with the invention an adhesive is provided which, after curing, has a matted surface in adaptation to the mattness of matted products to be bonded.

The adhesive has for its basis a polymerization adhesive, preferably a (meth)acrylate-based adhesive. Adhesives of this kind bond thermoplastics in particular.

Two different kinds of silica are added as a disperse powder to the polymerization adhesive.

Firstly a silica is added which has an average particle size of approximately 1 µm to 10 µm, preferably between 4 and 6 or 7 µm; also conceivable is a range from 1 to 8 or 9 µm. This silica serves as matting agent, i.e., it reduces the sheen of the surface of the cured adhesive. If the particle size chosen is much below 1 µm, the desired matting effect is not obtained. The surface appears smooth and shiny. Moreover, the adhesive syrup is strongly thickened by highly disperse silica powder having an average particle size of less than 1 µm, which hinders processing.

The matting agent alone, however, is not enough to produce a matted impression on the surface. The matting agent alone causes the surface of the cured adhesive to have a dull appearance.

A matted surface always has a certain surface roughness. Secondly, therefore, a silica is added which has an average particle size of more than 10 µm up to about 200 µm. This silica serves as texturing agent.

If the texturing agent alone is added to the adhesive, the desired matting effect is not obtained. In that case the surface of the cured adhesive appears to have a silk-sheen texture.

The particle size of the texturing agent determines the roughness of the surface of the cured adhesive. This can be adapted to the roughness of the plastics parts to be bonded.

If it is desired to bond plastics sheets which have been formed by casting onto etched glass and which therefore do have a matted surface but with a low level of roughness, then the particle size chosen for the texturing agent is preferably from 11 or 12 to 20 µm, in particular from 14 to 18 µm.

If in contrast plastics sheets are bonded which have been produced by an extrusion process and to which light scattering beads have been added which appear at the surface following extrusion and drying, then the particle size chosen for the texturing agent is in the range from 25 to 100 µm, in particular from 40 to 80 µm, adapted to the surface roughness determined by the light scattering beads. As a rule of thumb, the particle size can be taken to correspond approximately to twice the average surface roughness.

If the chosen particle size is too large, distinctly greater than 200 µm for instance, then the surface of the cured adhesive no longer gives a matted impression but instead merely a rough impression.

The adhesive of the invention is colorlessly translucent. It is therefore suitable for bonding all sheets, irrespective of their color. In terms of its color the adhesive seam visually matches the substrate, in other words the bonded or non-bonded plastics sheets.

For reasons of design it is also possible to color the adhesive by means of appropriate additions.

Furthermore silica is inert and does not swell or foam.

In the preparation of the adhesive the individual additions and other components are stirred together with one another.

The adhesive syrup to be stirred together is on the one hand viscous. On the other hand, owing to the addition of silica, it is also thixotropic. These two qualities contribute to the fact that it is no longer possible for the air bubbles that are introduced during the stirring of the components with the stirrer to escape unhindered. Air bubbles in the adhesive solution ought to be removed from the syrup again before the adhesive is used, since they would result otherwise in an irregular structure of the adhesive with cavities and bubbles on the surface of bond seams. This would adversely affect not only the esthetic appearance but also the strength of the adhesive. Preferably, therefore, a defoamer is added to the adhesive and mixed with the syrup. The effect of this defoamer is that the bubbles which are formed rise relatively quickly to the surface of the adhesive syrup, where they burst. The adhesive syrup that has stood for a certain time is then free of bubbles.

Frequently defoamers are used for solventborne coating systems. They are based generally on foam-destroying polymers and polysiloxanes. More suitable, however, are copolymers of alkyl vinyl ethers with polar alkyl vinyl ether derivatives, as claimed in EP 0 379 166. For the polymerization adhesive of the invention it is preferred to use foam-destroying polymers in solution in diisobutyl ketone (93% by weight) and Stoddard solvent (4% by weight), the Stoddard solvent used being Nota P with less than 0.1% by weight of benzene. A suitable commercially customary defoamer of this kind that is used with preference is the defoamer BYK 060N, sold by Byk-Chemie GmbH, Wesel, Germany. Between 0.3 and 1% by weight of the defoamer is used. It is preferred to use from 0.8 to 1% by weight.

As a result of the use of the defoamer the bubbles which form during the stirring of the syrup migrate rapidly to the surface of the syrup, where they burst.

It has been found appropriate to use a pyrogenic silica for the matting agent. A precipitated silica matting agent produces a slight yellow tinge. For the texturing agent it is possible to use either a precipitated silica or a pyrogenic silica. If a precipitated silica is used for the texturing agent, this does again result in a slight yellow tinge, but it is so slight that it can be tolerated.

All aftertreated silicas as well have adverse effects. The waxes that are applied to the surface give the adhesive a yellow coloration on curing.

In order to adapt the polymerization adhesive still further to the surface of the materials to be bonded, it is possible to use a combination of at least two texturing agents differing in particle size.

It has proven advantageous for the polymerization adhesive to contain 1-10% by weight of matting agent and 1-10% by weight of texturing agent, matting agent and texturing agent together contributing less than 11% by weight to the polymerization adhesive. Above the stated range the adhesive syrup is generally too viscous. Below the stated range the matting effect is generally too low. It is preferred to add from 1 to 5% by weight both of the matting agent and of the texturing agent. An addition of 3% by weight for both substances has proven ideal.

The polymerization adhesive can be used in particular for producing an adhesive bond from at least one matted article and another article. It is suitable for the adhesive bonding of components which may consist, for example, of acrylonitrile-butadiene-styrene (ABS), cellulose acetate-butyrate (CAB), polystyrene (PS), polycarbonate (PC), polyethylene terephthalate glycol (PETG), polyvinyl chloride (PVC), styrene/(α-styrene copolymer (S/MS), unsaturated polyester (UP) or wood, but especially for components made of PMMA.

The invention is illustrated below with reference to working examples.

1ST WORKING EXAMPLE

The first working example described is an adhesive for PMMA sheets which have been produced by casting onto etched glass and which therefore do have a matted surface but with a slight roughness. The following combination was employed for the adhesive. The percentages are based in each case on % by weight.

| | |
|---|---|
| 52.19% | methyl methacrylate (liquid monomer) |
| 22.4% | polymethyl methacrylate |
| 0.01% | stabilizer (4-methyl-2,6-di-tert-butylphenol) |
| 0.3% | accelerator (N,N-bis(2-hydroxypropyl)-p-toluidine-dipropoxy-p-toluidine) |
| 3% | crosslinker (tetraethylene glycol dimethacrylate) |
| 0.2% | regulator (2-ethylenehexyl thioglycolate) |
| 0.1% | UV-light-absorbing light stabilizer (2-hydroxy-4-methoxybenzophenone) |
| 15% | diluent (methyl methacrylate, liquid monomer) for setting a suitable viscosity |
| 3% | matting agent (pyrogenic silica having an average particle size of 6-7 μm) |
| 3% | texturing agent (precipitated silica having an average particle size of 14-18 μm) |
| 0.8% | defoamer (polysiloxane-based) |

The crosslinker supports the crosslinking of the polymerization chains. The regulator attenuates the polymerization so that the molecular weight remains within a moderate range. The light stabilizer absorbs UV light and leads to somewhat better surface curing.

The stabilizer prevents premature polymerization. Polymerization ought not to take place until the time of processing. For that purpose, prior to processing, a suitable catalyst or curative at about 3-6%, preferably 3%, is added to the adhesive syrup and stirred together with it until streaks are no longer visible. A customary catalyst is a 5% strength solution of dibenzoyl peroxide in diisobutyl phthalate.

The batch can be weighed out directly, together, into a vessel and subsequently mixed. The dispersing of the silica powder requires a dispersing stirrer, e.g., having a dissolver disk which has teeth both upwardly and below. The batch is stirred at about 22° C. for 5-10 min with 6-8000 revolutions/min.

Following the addition of the catalyst the cure time or polymerization time is about 50 to 55 minutes. The Vikat softening temperature is 78° C. or 95° C. if the adhesive has been conditioned at 80° C. for 5 hours after curing. The residual monomer content is 3.9% or 0.5% after conditioning.

Butt bonding of the stated PMMA sheets shows a very good strength of the bond seam. In the loading test there is fracture not of the bond seam but rather of the bonded plastics sheets (material fracture).

The tensile shear strength measurement in general accordance with DIN 53283 on a layer of adhesive 1.2 mm thick between two PMMA sheets gave values of around 40 MPa (megapascals), in other words well above the typically required value of 15 MPa.

The gloss measurement for determining the mattness in accordance with DIN 67530 gave a gloss value of 0.3 at an angle of 20° for the matted PMMA sheets of this working example. For the cured adhesive the value was 0.2. The adhesive without addition of the matting agent and of the texturing agent shows a gloss value of 52. Outstanding adaptation to the sheen of the bonded PMMA sheets was therefore achieved.

The roughness measurement in accordance with DIN 4768 on the surfaces gave an averaged depth of roughness of approximately 13 µm for the matted PMMA sheets of this working example. For the cured adhesive the value was approximately 8 µm. The adhesive without addition of the matting agent and of the texturing agent shows a depth of roughness of 0.15 µm. In this respect as well an outstanding adaptation to the properties of the bonded PMMA sheets was achieved.

The quantitative measurements outlined allow the composition of the adhesive to be optimized for the best-possible adaptation to the material to be bonded.

2ND WORKING EXAMPLE

The second working example described is an adhesive for PMMA sheets which have been produced by an extrusion process and to which light scattering beads have been added. Sheets of this kind have a relatively high surface roughness.

The formulation for the adhesive corresponds to that of the first working example with the sole difference that the texturing agent used is a precipitated silica having an average particle size of 70-100 µm.

Following the addition of the catalyst the cure time or polymerization time is about 45 minutes. The Vikat softening temperature is 77° C. or 97° C. if the adhesive has been conditioned at 80° for 5 hours after curing. The residual monomer content is 4.8% or 0.7% after conditioning.

Butt bonding of the stated PMMA sheets likewise shows a very good strength of the bond seam. In the loading test there is again fracture not of the bond seam but rather of the bonded plastics sheets (material fracture).

The tensile shear strength measurement in general accordance with DIN 53283 on a layer of adhesive 1.2 mm thick between two PMMA sheets gave values of around 37 MPa, in other words still well above the typically required value of 15 MPa.

The gloss measurement for determining the mattness in accordance with DIN 67530 gave a gloss value of 1 at an angle of 20° for the matted PMMA sheets of this working example. For the cured adhesive the value was 0.6. Outstanding adaptation to the sheen of the bonded PMMA sheets was therefore achieved.

The roughness measurement in accordance with DIN 4768 on the surfaces gave an averaged depth of roughness of approximately 23 µm for the matted PMMA sheets of this working example. For the cured adhesive the value was approximately 24 µm. In this respect as well an outstanding adaptation to the properties of the bonded PMMA sheets was achieved.

The invention claimed is:

1. A polymerization adhesive comprising:
   a) a matting agent comprising silica powder having an average particle size of from 1 µm to 10 µm; and
   b) a texturing agent comprising a first silica powder having an average particle size of from 40 µm to 80 µm.

2. The polymerization adhesive of claim 1, further comprising a defoamer.

3. The polymerization adhesive of claim 1, wherein the matting agent is a pyrogenic silica.

4. The polymerization adhesive of claim 1, wherein said texturing agent further comprises a second silica powder having an average particle size of more than 10 µm up to 200 µm, wherein the particle size of the second silica powder is different from the first silica powder.

5. The polymerization adhesive of claim 1, wherein the polymerization adhesive comprises
   1-10% by weight of the matting agent and
   1-10% by weight of the texturing agent,
   wherein the matting agent and the texturing agent together are less than 11% by weight of the polymerization adhesive.

6. The polymerization adhesive of claim 1, further comprising a colorant.

7. A method which comprises
   (i) applying the polymerization adhesive of claim 1 to one or more first article and/or
   (ii) applying the polymerization adhesive of claim 1 to one or more second article; and then
   (iii) contacting said one or more first article with said one or more second article.

8. The method according to claim 7, wherein the one or more first article is selected from the group consisting of acrylonitrile-butadiene-styrene polymer, cellulose acetate-butyrate polymer, polystyrene, polycarbonate, polyethylene terephthalate glycol, polyvinyl chloride, styrene/α-styrene copolymer, unsaturated polyester, wood and mixtures thereof.

9. The adhesive of claim 1, wherein the matting agent and the texturing agent comprise less than 11% by weight of the adhesive.

10. The adhesive of claim 1, wherein the matting agent and the texturing agent comprise from 1 to 5% by weight of the adhesive.

11. The adhesive of claim 1, wherein the matting agent and the texturing agent are present in equal amounts in the adhesive.

12. The adhesive of claim 1, wherein the silica powder of the matting agent is a pyrogenic silica and the silica powder of the texturing agent is a precipitated silica.

13. The adhesive of claim 1, further comprising a cross-linking agent for the adhesive.

14. The adhesive of claim 1, comprising a cross-linkable adhesive and a cross-linking agent for the adhesive.

15. The polymerization adhesive of claim 1, comprising a polymethylmethacrylate adhesive.

16. The adhesive of claim 15, further comprising methylmethacrylate liquid monomer.

17. A solid, cured adhesive obtained by curing the adhesive of claim 1.

* * * * *